United States Patent [19]

Shea et al.

[11] Patent Number: 4,499,332

[45] Date of Patent: Feb. 12, 1985

[54] PRESET BLOCK ASSEMBLY FOR UNDERFLOOR ELECTRICAL DISTRIBUTION SYSTEM

[75] Inventors: Yale R. Shea, Hales Corners; Kevin C. Zuege, West Milwaukee, both of Wis.

[73] Assignee: INRYCO, Inc., Milwaukee, Wis.

[21] Appl. No.: 425,339

[22] Filed: Sep. 28, 1982

[51] Int. Cl.³ .............................................. H02G 3/12
[52] U.S. Cl. ........................................ 174/48; 52/221
[58] Field of Search ...................... 174/48, 49, 96, 98; 52/221

[56] References Cited

U.S. PATENT DOCUMENTS

| | | | |
|---|---|---|---|
| 3,417,191 | 12/1968 | Fork | 174/49 |
| 3,592,956 | 7/1971 | Fork | 174/49 |
| 3,701,837 | 10/1972 | Fork | 174/50 |
| 3,721,051 | 3/1973 | Fork | 52/173 R |
| 3,932,696 | 1/1976 | Fork et al. | 174/48 |
| 3,973,366 | 8/1976 | Balane et al. | 52/99 |
| 4,010,314 | 3/1977 | Kohaut | 174/48 |
| 4,012,873 | 3/1977 | Lindner | 52/99 |
| 4,012,874 | 3/1977 | Brogan et al. | 52/99 |
| 4,041,238 | 8/1977 | Penczak | 174/48 |
| 4,178,469 | 12/1979 | Fork | 174/48 |
| 4,232,493 | 11/1980 | Gray et al. | 52/221 |

Primary Examiner—A. T. Grimley
Assistant Examiner—D. A. Tone
Attorney, Agent, or Firm—Marshall, O'Toole, Gerstein, Murray & Bicknell

[57] ABSTRACT

A preset block assembly adapted for use with an underfloor electrical distribution system having one or more electrical conductors enclosed in elongated, laterally spaced cells. The block assembly includes a housing having a terminal portion that rests on the top wall of one of the cells and encloses an opening therein. In one embodiment, the housing has depending portions at each end thereof which seat in valleys defined by cells on each side of the central cell of a set of three. In another embodiment, the housing has only one depending portion which seats in the valley between a pair of the cells. In both embodiments, an outwardly extending sleeve on the side wall of the depending portion or portions extends into an opening in the side wall of the cell or cells adjacent to the cell underlying the terminal portion. The sleeve or sleeves lock the housing to the cells and grommet the openings between the depending portion or portions and the adjacent cell or cells when the housing is shifted into operative engagement therewith. A cup-shaped casing having a pair of electrical power receptacles mounted in the open end thereof in oppositely inclined relation is mounted in the terminal portion so that the receptacles underlie and are accessible through the opening in the top wall of the terminal portion.

18 Claims, 8 Drawing Figures

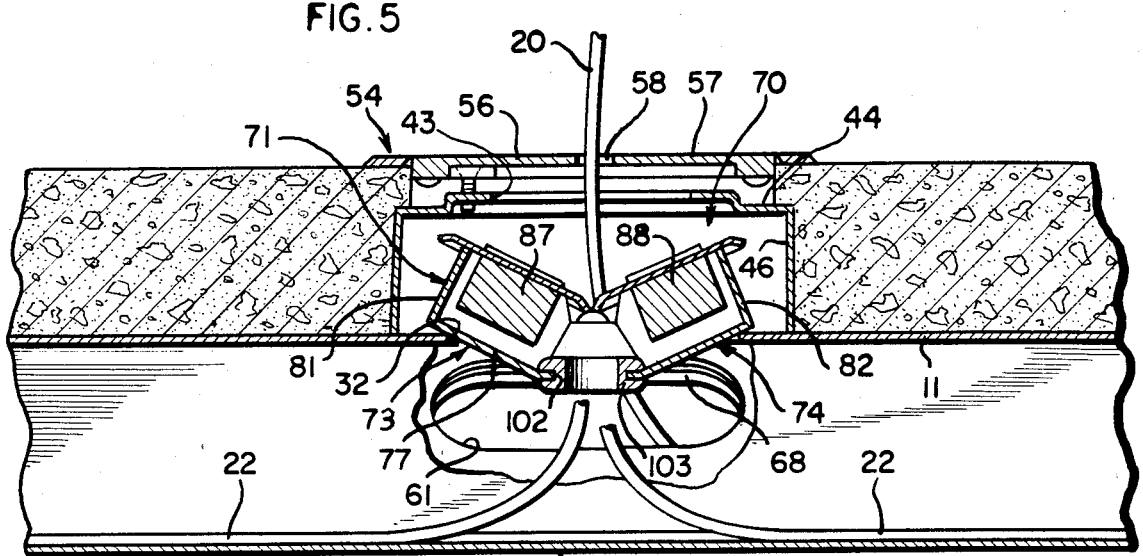
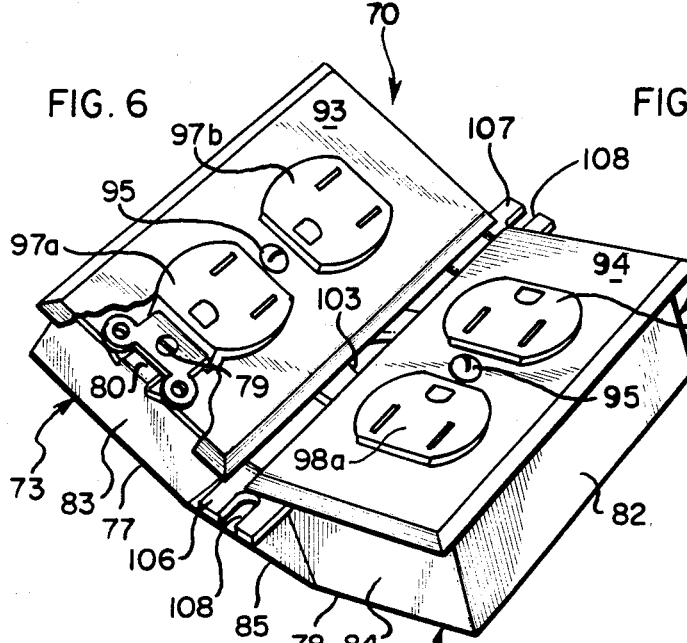
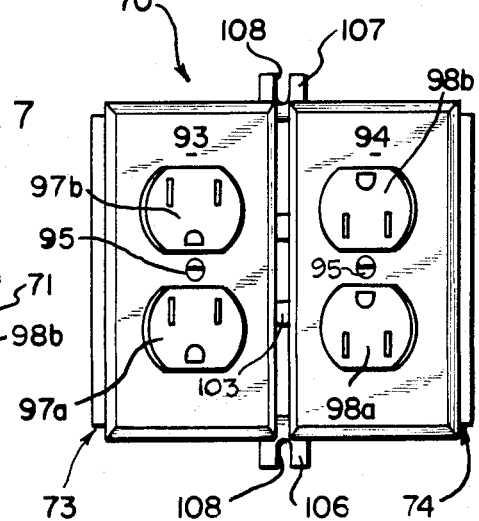
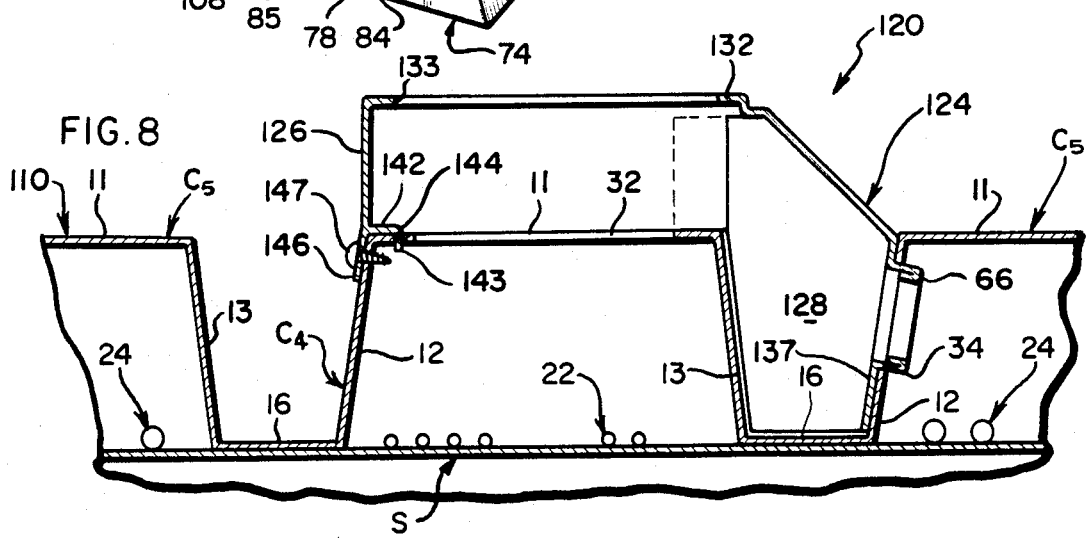

PRESET BLOCK ASSEMBLY FOR UNDERFLOOR ELECTRICAL DISTRIBUTION SYSTEM

BACKGROUND OF THE INVENTION

This invention relates to preset block assemblies for use in conjunction with underfloor electrical distribution systems, and more particularly relates to a preset block assembly which automatically interlocks with and grommets the openings in the cells of an underfloor raceway panel when the block assembly is shifted into operative engagement with the cells.

DESCRIPTION OF THE PRIOR ART

Preset block assemblies have heretofore been developed for use in conjunction with underfloor electrical distribution systems in order to provide access to the electrical conductors in the cells of the raceway panels of the system, when needed. Examples of preset block assemblies which achieve this objective are disclosed in the Penczak U.S. Pat. Nos. 4,041,238 and 4,096,347. The preset block assemblies disclosed in these patents have housings adapted to provide access to one or more of the electrical conductors in adjacent cells of an associated underfloor electrical distribution system through an opening in the upper portion of the housing of the block assembly.

While most of the preset block assemblies heretofore developed have proved generally satisfactory for their intended purposes, some have not for various reasons, such as difficulty in effecting a rapid and positive interlock between the housings of the block assemblies and the cells of the raceway panels prior to pouring the concrete floor.

Moreover, the internal structures utilized to support the electrical power plug receptacles in many of the preset block assemblies heretofore advanced were such that the connection or disconnection of electrical plugs with the receptacles was difficult, particularly when the opening in the top of the access housing of the block assembly was small, or the electrical power plug receptacle support structure did not underlie and face the opening in the top wall of the housing.

Accordingly, it is a general object of the present invention to provide a novel and improved preset block assembly which overcomes the aforementioned disadvantages and shortcomings of the prior art.

Another object is to provide a novel preset block assembly adapted for use with an electrical conductor carrying multicellular raceway panel, which automatically interlocks with one or more of the cells of the panel when the housing of the block assembly is shifted into an operative engaged position with the cells of the panel.

A more particular object is to provide a novel preset block assembly of the foregoing character, which includes tubular portions that surround openings in the side walls of the depending portions of the block assembly housing and automatically interlock the block assembly with one or more of the cells when the housing is shifted into operative engagement with the raceway panel, the tubular portions also serving to grommet the openings in the cells to protect electrical conductors extending through the tubular portions and into the terminal or central portion of the housing of the block assembly.

Still another object is to provide a novel preset block assembly of the character described, wherein the electrical power receptacles of the assembly are mounted in a central casing in the housing of the assembly so that the electrical receptacles underlie the access opening in the top wall thereof and are readily accessible through the access opening.

Still another object of the invention is to provide a novel preset block assembly of the character described, which is simple in construction, reliable in operation, and economical to manufacture.

These and other objects and advantages of the invention will become apparent from the following detailed description and accompanying sheets of drawings, in which:

DESCRIPTION OF THE DRAWINGS

FIG. 5 is a vertical cross sectional view, with some parts in elevation, taken substantially along the line 5—5 of FIG. 4;

FIG. 6 is a perspective view of the electrical outlet supporting casing of the preset block assembly illustrated in FIGS. 2 and 3;

FIG. 7 is a top plan view of the electrical outlet support casing of the preset block illustrated in FIG. 6; and FIG. 8 is a fragmentary vertical sectional view of another preset block assembly embodying the features of the present invention and adapted for use with a pair of the cells of a multicellular raceway panel of an underfloor electrical distribution system.

SUMMARY OF THE INVENTION

Figure 1:
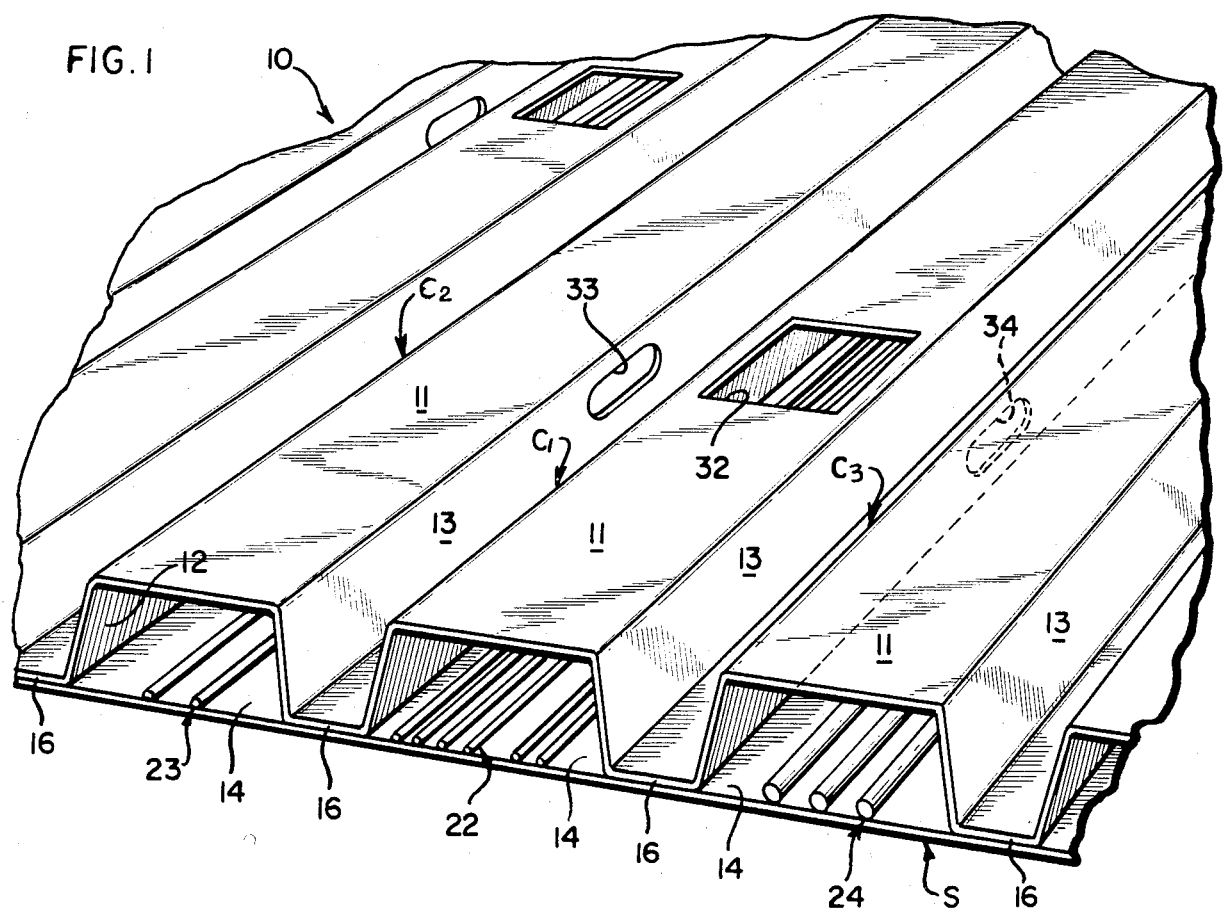
FIG. 1 is a perspective view of the multicellular raceway panel of an underfloor electrical distribution system as the latter would appear when mounted on a subfloor and showing the locations of the openings in the top and side walls of adjacent cells of the panel prior to engagement of a preset block assembly embodying the features of the present invention with the cells.

Briefly described, the present invention contemplates a novel preset block assembly that is adapted for use with an underfloor electrical distribution system, such system including one or more electrical conductors which are enclosed in the laterally spaced cells of raceway panels that are supported by a subfloor in the building in which the system is installed. Each cell of the panel includes a flat top wall and laterally spaced side walls which extend between the top wall and the subfloor, the cells being spaced from each other to define valleys therebetween.

In the preferred embodiment, the preset block assembly of the present invention is adapted to provide access to the interiors of three adjacent cells. To this end, an opening is provided in the top wall of the middle cell of the set of three, and openings are provided in the side walls of the cells of the set adjacent to the central cell. The housing of the block assembly of the present invention includes a central or terminal portion that is adapted to overlie the opening in the top wall of the central cell of the set, and depending portions which depend from each side of the terminal portion and which are adapted to extend into the valleys on each side of the central cell of the set when the block assembly is operatively engaged therewith.

According to the present invention, the depending portions of the block assembly housing include laterally spaced, outer side walls having openings therein and outwardly extending tubular portions surrounding the openings and adapted to extend into the openings in the side walls of the cells adjacent to the central cell of the set. When the tubular portions are disposed in the openings in the side walls of the adjacent cells, they interlock the housing of the block assembly with the cells. The tubular portions also serve to automatically grommet the openings in the side walls of the adjacent cells when disposed in the openings, thereby preventing damage to the electrical conductors which extend through the tubular portions and into the terminal portion of the block assembly.

The block assembly of the present invention also includes electrical power receptacle mounting means in the form of a cup-shaped casing having side and bottom walls, an open upper end, and at least one and preferably a pair of duplex electrical power receptacles supported at the upper end of the casing. The electrical power receptacles are preferably supported at the upper end of the casing so that the receptacles underlie an opening in the top wall of the central portion and so that the upper surfaces of the receptacles are inclined upwardly and oppositely with respect to the top walls of the cells.

The present invention also contemplates another preset block assembly that is adapted to engage a pair of the cells of the raceway panel of an underfloor electrical distribution system. The housing of this embodiment thus includes a terminal portion that is adapted to engage the top wall of one of a pair of cells of the panel, and a single depending portion which depends from one end of the terminal portion and which extends into the valley between the pair of cells. A tubular portion is provided in the outer side wall of the depending portion of this embodiment for extension through an opening in the side wall of the other cell. When the depending portion of the housing of this embodiment is seated in the valley, the housing is interlocked with the cells and the opening for the electrical conductors is automatically grommeted by the tubular portion.

The two cell block assembly also includes a cup-shaped casing that is mounted in the terminal portion of the housing of the assembly in the same manner as in the three cell assembly. The casing is likewise adapted to receive and support one or more electrical power receptacles in inclined relation to each other.

DESCRIPTION OF THE PREFERRED EMBODIMENTS

In FIG. 1 a portion of an underfloor electrical distribution system is illustrated and indicated generally at 10. The system 10 includes a plurality of elongated raceway panels, a portion of one of such panels being illustrated in FIG. 1. Each raceway panel includes a plurality of cells, each cell being generally in the shape of an inverted channel having a flat top wall 11 and laterally spaced generally vertically extending side walls 12 and 13. The walls 12 and 13 extend between the top wall 11 and the upper surface, indicated at 14, of a subfloor indicated generally at S. The cells are separated from each other by integral connecting portions or webs 16, which define valleys between each adjacent pair of cells.

The underfloor distribution system 10, in the present instance, is of the three cell type. Thus, as illustrated in FIGS. 1 and 2, the central cell of the set is indicated at $C_1$, the cell adjacent thereto to the left of the cell $C_1$, as viewed in FIG. 1, is indicated at $C_2$, and the cell adjacent thereto to the right of the central cell $C_1$ is indicated at $C_3$.

While different types and numbers of electrical conductors can be disposed in the cells $C_1$-$C_3$, it is preferred that a plurality of electrical power conductors, indicated generally at 22, be positioned in the central cell $C_1$ of the set, and one or more CRT conductors, indicated generally at 23, be enclosed in the cell $C_2$, and that at least one and preferably a plurality of communication or telephone conductors, indicated generally at 24, be enclosed in the cell $C_3$. It will be understood, however, that a different arrangement of the conductors 22, 23 and 24 could be employed in the cells $C_1$-$C_3$ of the distribution system 10, if desired.

According to the present invention, an access opening 32 is provided in the top wall 11 of the center cell $C_1$ and access openings 33 and 34 are provided in the side wall 13 of the cell $C_2$ and the side wall 12 of the cell $C_3$, respectively. The opening 32, in the present instance, is preferably rectangular and the openings 33 and 34 are preferably generally oval-shaped. Moreover, the openings 32, 33 and 34 extend generally parallel to the longitudinal axes of the cells $C_1$-$C_3$.

Figure 2:
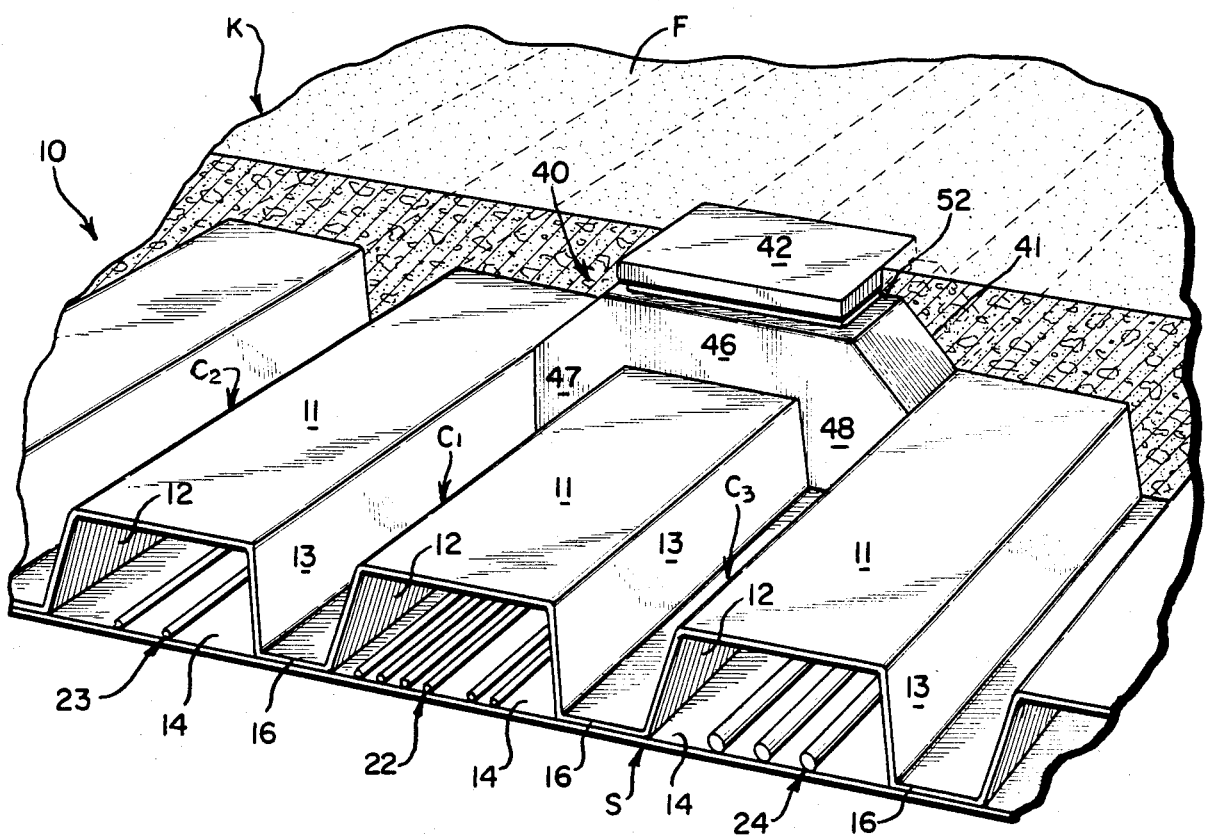
FIG. 2 is a fragmentary perspective view of the raceway panel of the underfloor electrical distribution system illustrated in FIG. 1 as the latter would appear when a preset block assembly embodying the features of the present invention is operatively engaged with three of the cells thereof and the opening in the top wall of the terminal portion of the housing of the block assembly is closed by a removable lid or cap.
Figure 3:
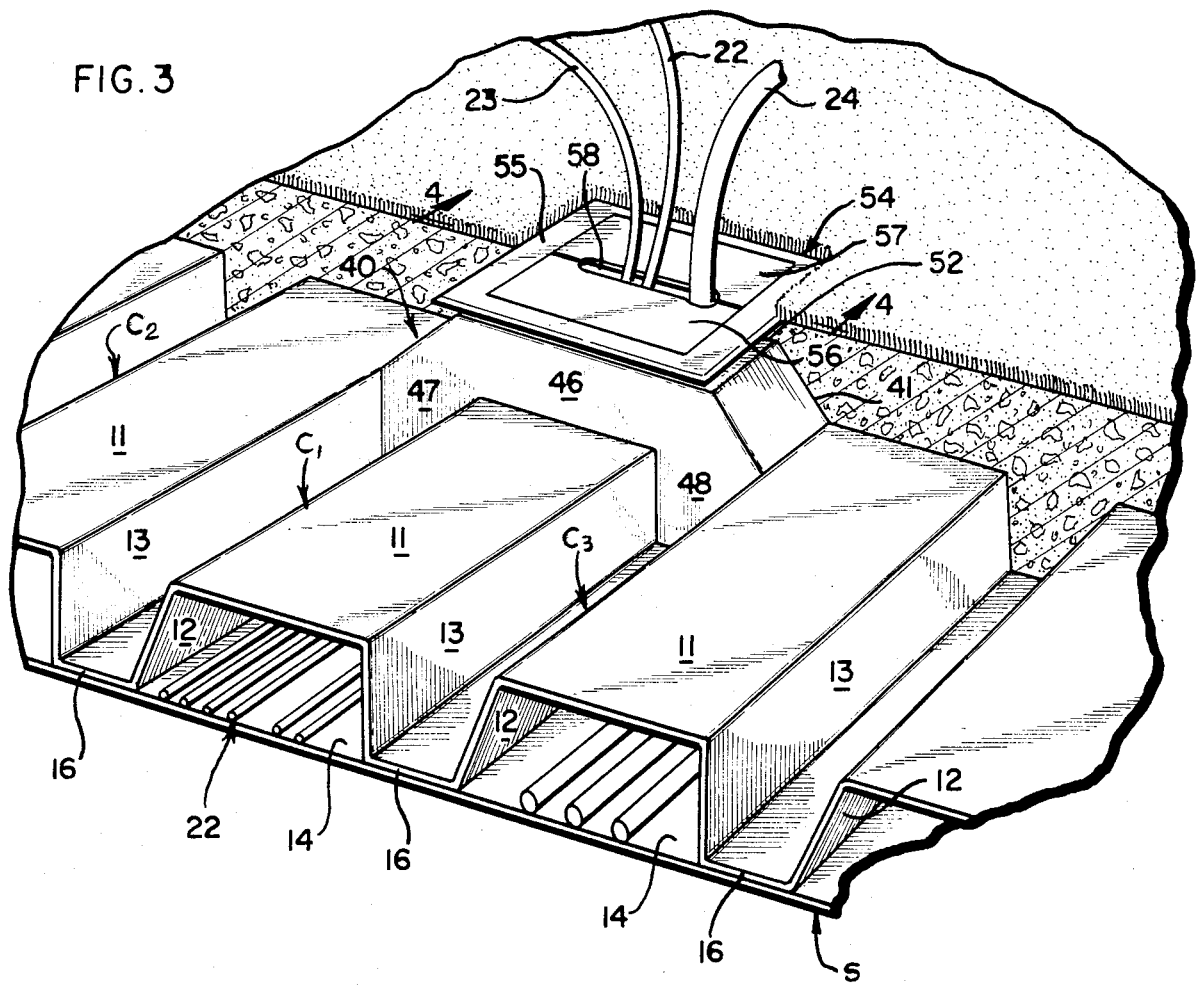
FIG. 3 is a fragmentary perspective view, similar to FIG. 2, but showing the preset block assembly of the present invention as it would appear when the temporary closure cap thereof has been removed and replaced by an apertured swingable door assembly, one of the conductors from each of the cells being shown as it would appear when extended through an opening provided by recesses in the edges of the doors of the block assembly.
Figure 4:
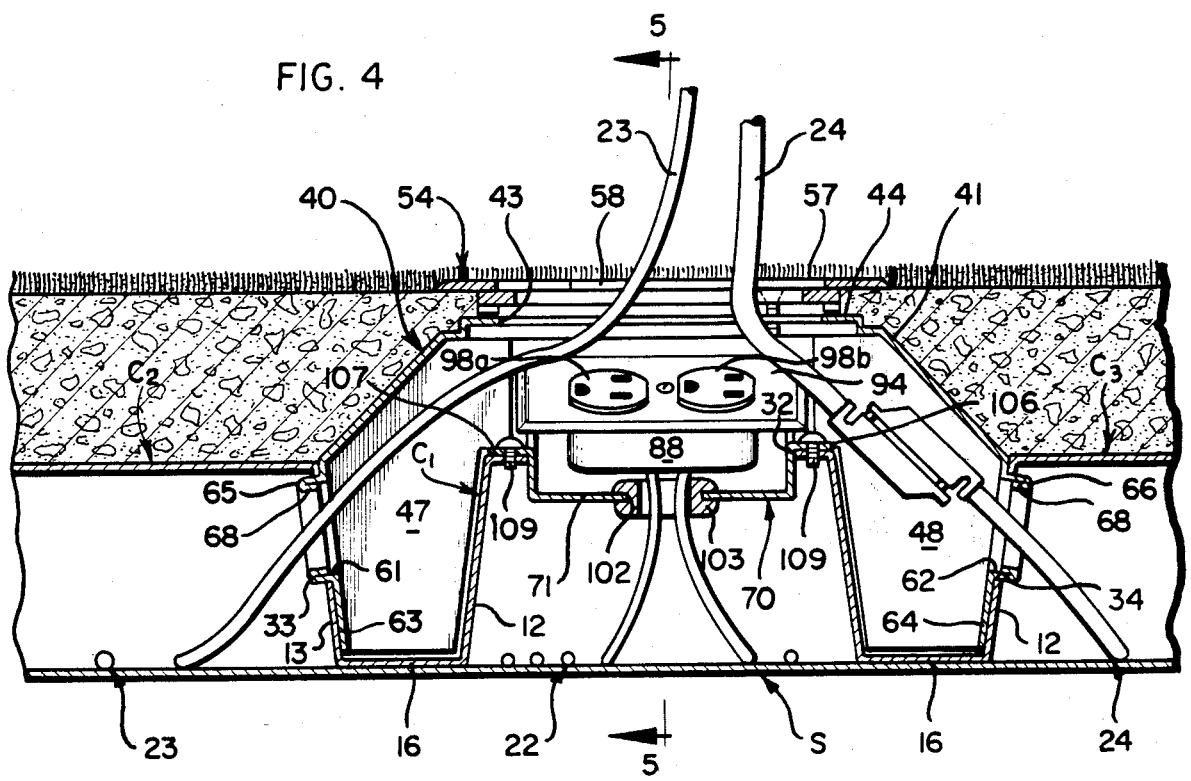
FIG. 4 is a fragmentary, vertical sectional view, with some parts in elevation, taken substantially along the line 4—4 of FIG. 3.

Referring now to FIGS. 2, 3 and 4 in conjunction with FIG. 1, the underfloor distribution system 10 is shown in FIG. 2 as it would appear when the housing, indicated at 41, of a preset block assembly 40 embodying the features of the present invention has been engaged with the cells $C_1$-$C_3$ of the raceway panel. A temporary closure or cover 42 is shown positioned in a rectangular-shaped opening 43 (FIG. 4) in the upper surface, indicated at 44, of the housing 41, and a layer of concrete has been poured over the cells of the distribution system. Such layer of concrete is indicated generally at K. The upper surface of the concrete layer K thus forms the main floor of the structure in which the distribution system 10 is installed.

As best seen in FIGS. 3 and 4, the housing 41 of the preset block assembly 40 is of a generally inverted U-shape, which is oblong in plan and which includes a central or terminal portion 46 having portions 47 and 48 that depend from each side of the terminal portion 46. The terminal portion 46 rests on the flat, top wall 11 of the cell $C_1$ of the set and encloses the opening 32 therein. The opening 43 in the top wall 44 of the terminal portion 46 provides access to the interior of the housing 41 and the cells $C_1$–$C_3$. When the block assembly 40 is in use, the cap 42 (FIG. 2) is removed and a rectangular frame and door assembly 54 is substituted therefor, the assembly 54 having a pair of doors 56,57 hinged thereto to close the opening 43 in the top wall 44 of the housing after one or more of the electrical conductors 22–24 in the cells $C_1$–$C_3$ have been drawn through the opening 43 or connections have been made therewith.

In order to accommodate the presence of one or more of the conductors 22–24, the adjacent edges of the doors 56 and 57 are recessed to provide a slot, indicated at 58, therebetween through which the conductors 22–24, extend.

The depending portions 47,48 of the housing 41 are of substantially the same cross sectional shape as the valleys between the cells $C_1$–$C_3$ so that the depending portions 47 and 48 seat in the valleys when the housing 41 is operatively engaged with a junction station of the distribution system 10.

According to the present invention, the housing 41 includes combined locking and grommeting means for securing the housing in its operatively engaged position with the cells $C_1$–$C_3$ and for preventing damage to conductors in the cells $C_2$ and $C_3$ that extend through openings 61 and 62 in the outer walls, indicated at 63 and 64, respectively, of the depending portions 47 and 48 of the housing 41. Such combined locking and grommeting means, in the present instance, comprises tubular portions or sleeves 65 and 66 on the outer walls 63 and 64, respectively, of the depending portions 47 and 48 and surrounding the openings 61 and 62. The sleeves 65 and 66 are preferably integrally formed with the outer walls 63 and 64 and are of the same external shape as that of the openings 33 and 34 in the cells $C_2$ and $C_3$ so that the sleeves 65 and 66 will closely fit and interlock in the openings 33 and 34 when the sleeves are disposed in these openings.

The length of the sleeves 65 and 66 is such that they will extend through the openings 33 and 34 in the side walls of the cells $C_2$ and $C_3$ when the housing 41 is seated in the valleys between the cells of the set and will remain interlocked with the cells even though there are some dimensional variations. Extension of the sleeves 65 and 66 through the openings 33 and 34 takes place shortly before the housing 44 reaches the position thereof illustrated in FIGS. 2–4, inclusive, and is accomplished by flexure of the material of the side walls 13 and 12 of the cells $C_2$ and $C_3$, respectively, and flexure of the outer walls 63 and 64 of the depending portions 47 and 48. To this end, the material of the housing 41 is preferably of sheet metal, which will flex sufficiently as the depending portions 47 and 48 descend in the valleys between the cells without causing permanent deformation of the material of the side walls 63 and 64.

In order to reduce the possibilities of abrasion or damage to the electrical conductors in the cells $C_2$ and $C_3$, when the conductors are disposed in the sleeves 65 and 66, the outer ends of the sleeves 65 and 66 are rolled inwardly, as at 68, to form a lip or bead. The inturned lips 68 thus provide a smooth surface which minimizes the possibility of abrasion or other damage to the electrical conductors extending through the sleeves 65 and 66.

Referring now to FIGS. 5, 6 and 7 in conjunction with FIG. 4, it will be seen that the terminal portion 46 of the preset block assembly 40 includes electrical receptacle mounting means, indicated generally at 70, for supporting at least one and preferably a pair of electrical receptacles in the block assembly 40 so that one or more plugs (not shown), which are connected to the ends of wires of devices requiring alternating current to operate the same, may be connected to the receptacles by opening the doors 56 and 57. The electrical receptacle mounting means 70 thus preferably comprises a generally cup-shaped casing 71 which, in the present instance, includes a pair of generally rectangular, upwardly inclined portions 73 and 74 having upwardly inclined bottom walls 77 and 78, upstanding side walls 81 and 82 and longitudinally spaced end walls 83 and 84, respectively. The inclined bottom walls 77 and 78 are connected by a central wall portion 85 which is parallel to the subfloor S and top wall 11 of the center cell $C_1$ when the casing 71 is mounted in the terminal portion 46. The angle of inclination of each of the bottom walls 77 and 78 with respect to the central wall portion 85 is about $22\frac{1}{2}°$.

According to the present invention, a pair of duplex electrical receptacles, indicated at 87 and 88 in FIG. 5 are mounted in the inclined, rectangular portions 73 and 74 of the casing 71. Each of the receptacles 87 and 88 is secured by a pair of screws, one of which is shown in FIG. 6 and indicated at 79, to a pair of tabs which extend inwardly from the upper edges of the end walls 83 and 84. One of these tabs is indicated at 80 in FIG. 6. The receptacles 87 and 88 are enclosed by conventional duplex cover plates 93 and 94, which are secured to the receptacles by screws 95. The exposed faces of the receptacles 87 and 88 are respectively indicated at $97a,97b$ and $98a,98b$ in FIGS. 6 and 7 and each is inclined upwardly with respect to the subfloor S and top wall 11 of the cell $C_1$ by an angle of about $22\frac{1}{2}°$.

Access to the interior of the cup-shaped casing 71 is provided by an opening 102 (FIG. 5) located centrally in the central portion 85 of the casing 71, an elastomeric grommet 103 being mounted in the opening 102 to protect the wires passing therethrough. Thus, when the block assembly 40 is in use, one or more of the power conducting wires 22 in the cell $C_1$ extends through the grommet 103 and is connected to terminals (not shown) on the receptacles 87 and 88.

In order to secure the casing 71 in its operative position in the terminal portion 46, the longitudinally spaced end walls of the central portion 85 are provided with outwardly extending tabs 106 and 107 having slots 108 therein which are adapted to receive fasteners, such as screws 109 (FIG. 4). The screws 109 are threaded into openings in the top wall 11 of the cell $C_1$.

It will be noted that when the casing 71 is operatively mounted in the terminal portion 46, portions thereof extend into the rectangular-shaped opening 32 in the top wall 11 of the cell $C_1$ so that the edges, indicated at 113, of the opening 32, as well as the tabs 106 and 107, locate and stabilize the casing 71 in the terminal portion.

With the foregoing construction, it will now be apparent that in the event that it is desired to establish a telephone, power and CRT outlet in the underfloor distribution system 10, such as at one of the locations where the housing 41 of the preset block assembly 40 has previously been installed and connected to the cells $C_1$–$C_3$, as previously described, it is only necessary to remove the temporary closure 42 and then establish connections with the electrical conductors 22, 23 and 24 in the cells $C_1$–$C_3$, respectively, by withdrawing the conductors 23 and 24 through the grommeted openings 33 and 34 in the side walls of the cells $C_2$ and $C_3$, and likewise withdrawing one or more of the electrical power conductors 22 through the opening 32 in the top wall 11 of the cell $C_1$. The electrical conductors 22 may then be inserted through the grommet 103 in the bottom of the casing 71 while the casing 71 is still spaced from the housing 41. After the electrical conductors are connected to the duplex receptacles 87 and 88, the latter are mounted in the casing 71 and the latter is then installed in the terminal portion 46 of the housing 40 by threading the screws 109 through the slots 108 in the tabs 106 and 107.

After the casing 71 has been mounted in the terminal portion 46 of the housing 44, the frame and access door assembly 54 is secured to the upper surface of the terminal portion 46 of the housing 44 with the CRT and telephone cables 23 and 24, respectively, extending through the open doors of the frame and door assembly 54. Thereafter, one or more electrical plugs may be inserted into the power receptacles 87 and 88, and the doors 56 and 57 may then be closed. The slots 58 in the doors 56 and 57 accommodate the presence of the conductors 22–24. After the junction with the conductors in the underfloor electrical distribution system 10 has thus been established, it may so remain until the junction is no longer needed. At that time, the connections with the conductors in the cells $C_1$–$C_3$ may be broken and the access and door frame assembly 54 removed from the housing 41, if desired.

Referring now to FIG. 8, an alternate preset block assembly embodying the features of the present invention is illustrated and indicated generally at 120. Like reference numerals have been used to identify the parts of the preset block assembly 120 identical with those of the preset block assembly 40.

As will be apparent from FIG. 8, the preset block assembly 120 differs from the preset block assembly 40 in that the housing, indicated at 124, of the assembly 120 is intended to provide access to the electrical conductors in the cells of a raceway panel of an underfloor electrical distribution system, such as the distribution system 10. For the purposes of understanding the construction and operation of the block assembly 120, it will be assumed that the latter is to be installed in an underfloor electrical distribution system in which electrical conductors are provided in adjacent pairs of the elongated cells of the raceway panel having the same general construction as the cells $C_1$–$C_3$ of the raceway panel of the system 10. Such system is indicated generally at 110, and a pair of the cells thereof with which the block assembly 120 is adapted for use is indicated at $C_4$ and $C_5$ in FIG. 8. The electrical conductors in the cells $C_4$ and $C_5$ are indicated at 22 and 24, respectively. The conductors 22, in the present instance, are electrical power conductors, and the conductors 24 comprise telephone cables. The cells $C_4$ and $C_5$ are also similar to the cells $C_1$ and $C_3$ of the distribution system 10 in that the cell $C_4$ is provided with a rectangular opening 32 in the top wall 11 thereof and an oval-shaped opening 34 is provided in the side wall 12 of the adjacent cell $C_5$.

The housing 124 of the preset block assembly 120 is similar to the housing 41 of the block assembly 40 in that the housing 124 is oblong in plan and includes a terminal portion 126 that is adapted to rest on the flat, top wall 11 of the cell $C_4$ so as to enclose the opening 32 therein. The top wall, indicated at 132 of the terminal portion 126 has a rectangular-shaped opening 133 therein, which provides access to the interior of the housing 124 and the cells $C_4$ and $C_5$.

The housing 124 is also similar to the housing 41 in that the housing 124 includes a portion 138, which depends from one side of the terminal portion 126 and which is of substantially the same cross sectional shape as the valley between the cells $C_4$ and $C_5$. Consequently, the depending portion 138 will seat in the valley between the cells $C_4$ and $C_5$ when the housing 124 is operatively engaged with a junction station of the distribution system 110.

The housing 124 of the block assembly 120 is also similar to the housing 41 of the block assembly 40 in that the housing 124 also includes combined locking and grommeting means for securing the housing 124 in its operatively engaged position with the cells $C_4$ and $C_5$ and for preventing damage to conductors in the cell $C_5$ that extend through the depending portion 128. Such combined locking and grommeting means, in the present instance, comprises a tubular portion or sleeve 66 on the outer wall, indicated at 137, of the depending portion 128. The sleeve 66 is preferably integrally formed with the outer wall 137 and is of the same external shape as that of the opening 34 in the side wall 12 of the cell $C_5$ so that the sleeve 66 will closely fit and interlock in the opening 34 when the sleeve is disposed in the opening.

The length, and other structural details thereof of the sleeve 66 and depending portion 128, and the manner in which the depending portion is caused to interlock with the cell $C_5$, is the same as that of the sleeve 66 of the housing 41 of the block assembly 40. Consequently, reference should be made in the specification to the description of the construction and operation of the sleeve 66 of the housing 41, and its coaction with the opening 34 in the cell $C_3$, for an understanding of the construction and operation of the sleeve 66 of the depending portion 128 of the housing 124, and its coaction with the opening 34 in the cell $C_5$.

The housing 124 differs from the housing 41 of the previous embodiment in that the former does not include a portion which depends from the opposite side of the terminal portion 126 to interlock with the opposite adjacent raceway $C_5$. Instead, the terminal portion 126 of the housing 124 preferably includes an inwardly extending tab 142 that is adapted to rest upon the upper surface 11 of the cell $C_4$, and a tang 143 at the inner end of the tab 142, which extends downwardly therefrom. The tang 143 is adapted to extend into a slot 144 in the top wall 11 of the cell $C_4$, adjacent to the opening 32, to prevent lateral shifting of the housing 124 relative to the cell $C_4$.

The side wall of the terminal portion 126 also includes one or more, substantially vertically extending tabs 146, which are adapted to overlap a portion of the outer surface of the side wall 12 of the cell $C_4$ and to receive one or more threaded fasteners therethrough, such as sheet metal screws, one of which is indicated at 147 in FIG. 8. When threaded into the side wall 12, the screws 147 prevent upward movement of the left end of the terminal portion 126 of the housing 124 as viewed in FIG. 8.

Prior to use and before a layer of concrete is poured over the pairs of cells $C_4$ and $C_5$ of the raceway panel, a temporary closure or cover (not shown) may be positioned in the opening 133 of the housing 124, as in the previous embodiment. In addition, receptacle mounting means, such as the casing 71 (not shown in FIG. 8) of the previous embodiment, may be mounted in the terminal portion 126 of the housing 124 to provide connections with the power conductors 22 in the cell C4, and a frame and access door assembly (also not shown), similar to the door and frame assembly 54, may be connected to the top wall 132 of the terminal portion 126 in the manner of the frame and door assembly 54 of the previous embodiment. The preset block assembly 120 is otherwise the same as and functions in the same manner as the block assembly 40 of the previous embodiment.

While one or more embodiments of the invention have been herein illustrated and described in detail, it will be understood that modifications and variations thereof may be developed which do not depart from the spirit of the invention and the scope of the appended claims.

I claim:

1. A preset block assembly for providing access to the conductors of an underfloor electrical distribution system, said distribution system including at least one raceway panel adapted to be supported on a subfloor and having a plurality of elongated laterally spaced cells, each of said cells being adapted to enclose one or more of the electrical conductors of said distribution system and including a top wall spaced above said subfloor and laterally spaced side walls extending between said top wall and said subfloor, and said cells being laterally spaced from each other so as to define valleys therebetween, said block assembly comprising a housing having a terminal portion adapted to overlie the top wall of one of said cells and an opening in said top wall, said terminal portion also having a top wall and an opening in said top wall providing access to the interior thereof, said housing also having at least one depending portion connected to one side of said terminal portion and adapted to extend into the valley between said one cell and a cell adjacent thereto, said depending portion including longitudinally spaced end wall portions and a laterally spaced, outer side wall adapted to engage the adjacent side wall of said adjacent cell, said side wall of said adjacent cell having an opening therein providing access to the electrical conductors therein, said laterally spaced outer side wall of said depending portion having an opening therein adapted to register with the opening in the side wall of said adjacent cell when said depending portion of said block assembly is seated in said valley, and combined locking and grommeting means carried by one of said side walls of said depending portion and adjacent cell, whereby said block assembly provides access to and permits connections to be made with the electrical conductors at least in said one cell and said adjacent cell through the access opening in said terminal portion and said combined locking and grommeting means serves to secure said housing at least to said adjacent cell and to prevent damage to the electrical conductors extending through the opening in the side wall of said adjacent cell.

2. The preset block assembly of claim 1, in which said combined locking and grommeting means comprises an outwardly extending tubular portion on the outer side wall of said depending portion and surrounding the opening therein, and said tubular portion is adapted to extend through said opening in the side wall of said adjacent cell.

3. The preset block assembly of claim 2, in which said outwardly extending tubular portion includes an anti-abrasion and strengthening portion.

4. The preset block assembly of claim 3, in which said anti-abrasion and strengthening portion comprises a lip around the outer end of said outwardly extending tubular portion.

5. The preset block assembly of claim 4, in which said lip is rolled inwardly toward the interior of said tubular portion so that the exterior of said tubular portion is of substantially the same size throughout its length.

6. The preset block assembly of claim 2, 3, 4 or 5, in which a depending portion is provided on each side of the terminal portion of said housing, said depending portions are respectively adapted to extend into the valleys provided by cells adjacent to and on each side of said one cell, the side walls of the cells adjacent to said one cell each has an opening therein, and the laterally spaced outer side walls of said depending portions each has an opening therein adapted to register with the opening in the side wall of the cell adjacent thereto, said tubular portions surround the openings in the outer side walls of said depending portions and are adapted to extend through the openings in the side walls of said adjacent cells when said block assembly is operatively engaged with said cells with said depending portions seated in said valleys, whereby said block assembly provides access to and permits connections to be made with the electrical conductors in said one cell and said adjacent cells through the access opening in said terminal portion and said tubular portions serve to secure said housing to said adjacent cells and to prevent damage to the electrical conductors extending through the openings in the side walls of said adjacent cells.

7. A preset block assembly adapted to be mounted in the floor of a building and to provide access to and permit connections to be made to one or more of the electrical conductors of an underfloor electrical distribution system, said distribution system including at least three, adjacent, elongated, laterally spaced cells that are supported on a subfloor below said floor, each of said cells having at least one electrical conductor therein and a top wall spaced above said subfloor and laterally spaced side walls extending between said top wall and said subfloor, each adjacent pair of said cells having a valley therebetween, said block assembly including a housing having a terminal portion and laterally depending portions connected to said terminal portion, said terminal portion being adapted to engage the top wall of the central cell of said set and to provide access to the conductors therein through an opening in the top wall of said central cell, said depending portions respectively being adapted to seat in the valleys adjacent to said central cell, and said depending portions having outer side walls having tubular portions adapted to extend through openings in the adjacent side walls of the cells adjacent to said central cell and thereby provide access to the conductors in the cells adjacent to said central cell, said tubular portions also serving to lock to said block assembly in engaged relation with the cells of said set.

8. A preset block assembly adapted to provide access to the electrical conductors of an underfloor electrical distribution sustem, said system including at least first and second adjacent elongated, laterally spaced, cells adapted to be supported on a subfloor and said first cell being adapted to enclose one or more electrical power conductors, said adjacent cells forming a valley therebetween, each of said cells having a top wall spaced above said subfloor and laterally spaced side walls extending between said top wall and said subfloor, said top wall of said first cell having an opening therein and a side wall of said second cell having an opening therein adjacent said valley, said block assembly including a housing having a terminal portion adapted to overlie the opening of said top wall of said first cell having said electric power conductors enclosed therein, said terminal portion also having a top wall having an opening therein, and closure means closing said opening in said top wall of said housing, electrical receptacle mounting means mounted in said terminal portion of said housing and at least one electrical power receptacle carried by said receptacle mounting means, said electrical receptacle being adapted to be connected to at least one of said electrical power conductors and underlying said opening in said top wall of said terminal portion to facilitate engagement or disengagement of an electrical plug with said receptacle, said housing further including a depending portion extending below the bottom of said terminal portion and being adapted to extend into said valley, said depending portion including outer side walls having an opening therein for facing said opening of said side wall of said second cell.

9. The preset block assembly of claim 8, in which said receptacle mounting means supports said electrical receptacle in an inclined position with respect to the top wall of said terminal portion.

10. The preset block assembly of claim 9, in which a pair of said electrical receptacles are carried by said mounting means in side-by-side relation.

11. The preset block assembly of claim 10, in which the upper surfaces of said pair of electrical receptacles are inclined oppositely and upwardly with respect to said top wall of said terminal portion.

12. The preset block assembly of claim 11, in which the angle of inclination of the upper surfaces of each of said electrical receptacles with respect to said top wall is about $22\frac{1}{2}°$.

13. The preset block assembly of claim 10, in which said electrical receptacles are substantially symmetrically, vertically centered under rhe opening in the top wall of the terminal portion of said housing.

14. In a preset block assembly adapted to provide access to the electrical conductors of an underfloor electrical distribution system, said system including a plurality of elongated, laterally spaced, cells adapted to be supported on a subfloor and each adapted to enclose one or more, electrical power conductors, each of said cells having a top wall spaced above said subfloor and laterally spaced side walls extending between said top wall and said subfloor, said block assembly including a housing having a terminal portion adapted to overlie the top wall of the cell having said electric power conductors enclosed therein, said terminal portion also having a top wall having an opening therein, and closure means closing said opening in said top wall of said housing, the improvement of electrical receptacle mountting means mounted in said terminal portion of said housing and at least one electrical power receptacle carried by said receptacle mounting means, said electrical receptacle being adapted to be connected to at least one of said electrical power conductors and underlying said opening in said top wall of said terminal portion to facilitate engagement or disengagement of an electrical plug with said receptacle, said receptacle mounting means supporting said electrical receptacle in an inclined position with respect to the top wall of said terminal portion, a pair of said electrical receptacles being carried by said mounting means in side-by-side relation, said receptacle mounting means including a generally cup-shaped casing having side and bottom walls and an open upper end, and said electrical receptacles being supported at said open upper end.

15. The preset block assembly of claim 14, in which the bottom wall of said casing has an opening therein adapted to receive at least one electrical power conductor from said electrical power conductor cell.

16. The preset block assembly of claim 15, in which at least a portion of the bottom wall of said casing extends into, engages and is supported in part by at least one of the edges of the opening in the top wall of said electrical power conductor cell.

17. The preset block assembly of claim 16, in which said opening in the top wall of said electrical power conductor cell is rectangular, and the outer periphery of said casing is likewise rectangular and sized to engage at least two of the edges of said opening in said electrical power conductor cell.

18. The preset block assembly of claim 14, in which said casing includes adjacent, upwardly inclined portions, said electrical receptacles are respectively mounted in said upwardly inclined portions.

* * * * *